United States Patent
Tsang et al.

(10) Patent No.: US 7,908,329 B2
(45) Date of Patent: Mar. 15, 2011

(54) ENHANCED E-MAIL FOLDER SECURITY

(75) Inventors: Brian Joseph Tsang, Redmond, WA (US); Stanley Grant, Redmond, WA (US); Lubdha Khandelwai, Redmond, WA (US); Robert Pengelly, Seattle, WA (US); Joseph Xavier, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 11/206,010

(22) Filed: Aug. 16, 2005

(65) Prior Publication Data
US 2007/0043815 A1  Feb. 22, 2007

(51) Int. Cl.
G06F 15/16 (2006.01)
(52) U.S. Cl. ...................................................... 709/206
(58) Field of Classification Search .................. 709/205, 709/206, 207
See application file for complete search history.

(56) References Cited

U.S. PATENT DOCUMENTS

| | | | |
|---|---|---|---|
| 6,023,723 A | 2/2000 | McCormick et al. | |
| 6,199,103 B1 | 3/2001 | Sakaguchi et al. | |
| 6,237,030 B1 * | 5/2001 | Adams et al. | 709/218 |
| 6,868,436 B1 | 3/2005 | Fleming, III et al. | |
| 7,546,334 B2 * | 6/2009 | Redlich et al. | 709/201 |
| 7,580,982 B2 * | 8/2009 | Owen et al. | 709/206 |
| 2001/0033297 A1 * | 10/2001 | Shastri et al. | 345/741 |
| 2002/0047863 A1 * | 4/2002 | Hyman | 345/744 |
| 2004/0128355 A1 * | 7/2004 | Chao et al. | 709/206 |
| 2005/0080642 A1 * | 4/2005 | Daniell | 705/1 |
| 2005/0154601 A1 * | 7/2005 | Halpern et al. | 705/1 |
| 2005/0165895 A1 * | 7/2005 | Rajan et al. | 709/206 |
| 2005/0289148 A1 * | 12/2005 | Dorner et al. | 707/10 |
| 2006/0041837 A1 * | 2/2006 | Amir et al. | 715/513 |
| 2006/0101334 A1 * | 5/2006 | Liao et al. | 715/523 |
| 2006/0168006 A1 * | 7/2006 | Shannon et al. | 709/206 |
| 2006/0206571 A1 * | 9/2006 | Kuwahara | 709/206 |

FOREIGN PATENT DOCUMENTS

| KR | 1020040072059 A | 8/2004 |
|---|---|---|
| KR | 1020050022284 A | 3/2005 |

OTHER PUBLICATIONS

Cranor, Lorrie et al., Spam!, Communications of the ACM. vol. 41, No. 8. (Aug. 1998), pp. 74-83.*
International Search Report regarding International Application No. PCT/US2006/031966 dated Jan. 12, 2007.
Written Opinion of the International Searching Authority regarding International Application No. PCT/US2006/031966 dated Jan. 12, 2007.
International Preliminary Report on Patentability regarding International Application No. PCT/US2006/031966 dated Jan. 12, 2007.
Office Action from The Patent Office of The State Intellectual Property Office of The People's Republic of China regarding Application No. 200680030076.2 dated May 21, 2010.
"Email Client Terminal Software", PC Magazine Chinese Edition, Mar. 2004.

* cited by examiner

Primary Examiner — John Follansbee
Assistant Examiner — Madhu Woolcock

(57) ABSTRACT

Various technologies and techniques are disclosed that enhance the security of electronic mail messages and folders. Messages that are deemed to be less secure and have a higher security risk, such as unsolicited commercial e-mail (i.e. SPAM) and phishing messages, are reformatted and displayed in plain text with hyperlinks disabled in certain circumstances. For example, messages in a junk e-mail folder may be reformatted and displayed in plain text with hyperlinks disabled to make them safer for the user to interact with.

20 Claims, 11 Drawing Sheets

ENHANCED E-MAIL FOLDER SECURITY

BACKGROUND

Electronic mail (e-mail) messages are a popular form of communication between parties. Not surprisingly, as e-mail use has increased, e-mail abuse has also increased. For example, e-mail is often used by companies to send unsolicited commercial e-mail (sometimes called SPAM) to masses of people to promote their products or services. E-mail messages are also used to send viruses as attachments that will cause harm if executed, such as by infecting the recipient's computer with some annoying program or by obtaining confidential or sensitive information. More recently, e-mail messages are also being used to send phishing messages that appear to be sent from a source that the recipient trusts and are designed to lure the recipient to a web site that will obtain confidential information from the recipient. It is not uncommon for a particular user to receive dozens or even hundreds of unwanted messages like these every single day. These unwanted messages by their very nature are less secure and potentially more destructive to a user's computer than those that the recipient wanted and/or expected.

SUMMARY

Described herein are various technologies and techniques that enhance the security of electronic mail messages and folders. Messages that tend to be less secure and have a higher security risk, such as unsolicited commercial e-mail (i.e. SPAM) and phishing messages (i.e. messages falsely appearing to be from a known and trusted source and/or containing links to web sites that will obtain confidential information from the recipient), are reformatted and displayed in plain text with hyperlinks disabled in certain circumstances.

As one non-limiting example, the overall security of a junk e-mail folder can be improved by using one or more of the techniques described herein, as messages in a junk e-mail folder tend to be less secure or potentially more damaging by default. When the user selects a particular message in the junk e-mail folder to view, the selected message is reformatted from the original received format to a modified format. The modified format includes plain text for the content of the message with hyperlinks that are disabled. A user can move the message from the junk e-mail folder to another folder, such as the inbox. Once in the inbox or other folder, the message can be displayed in the original format, but with hyperlinks enabled or disabled depending on the security risk of the message. As a few non-limiting examples, an unsolicited commercial e-mail message might be displayed in the original format with hyperlinks enabled, whereas a phishing message, which is potentially more dangerous to the user, might be displayed in the original format but with hyperlinks disabled. Numerous other variations are also possible.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
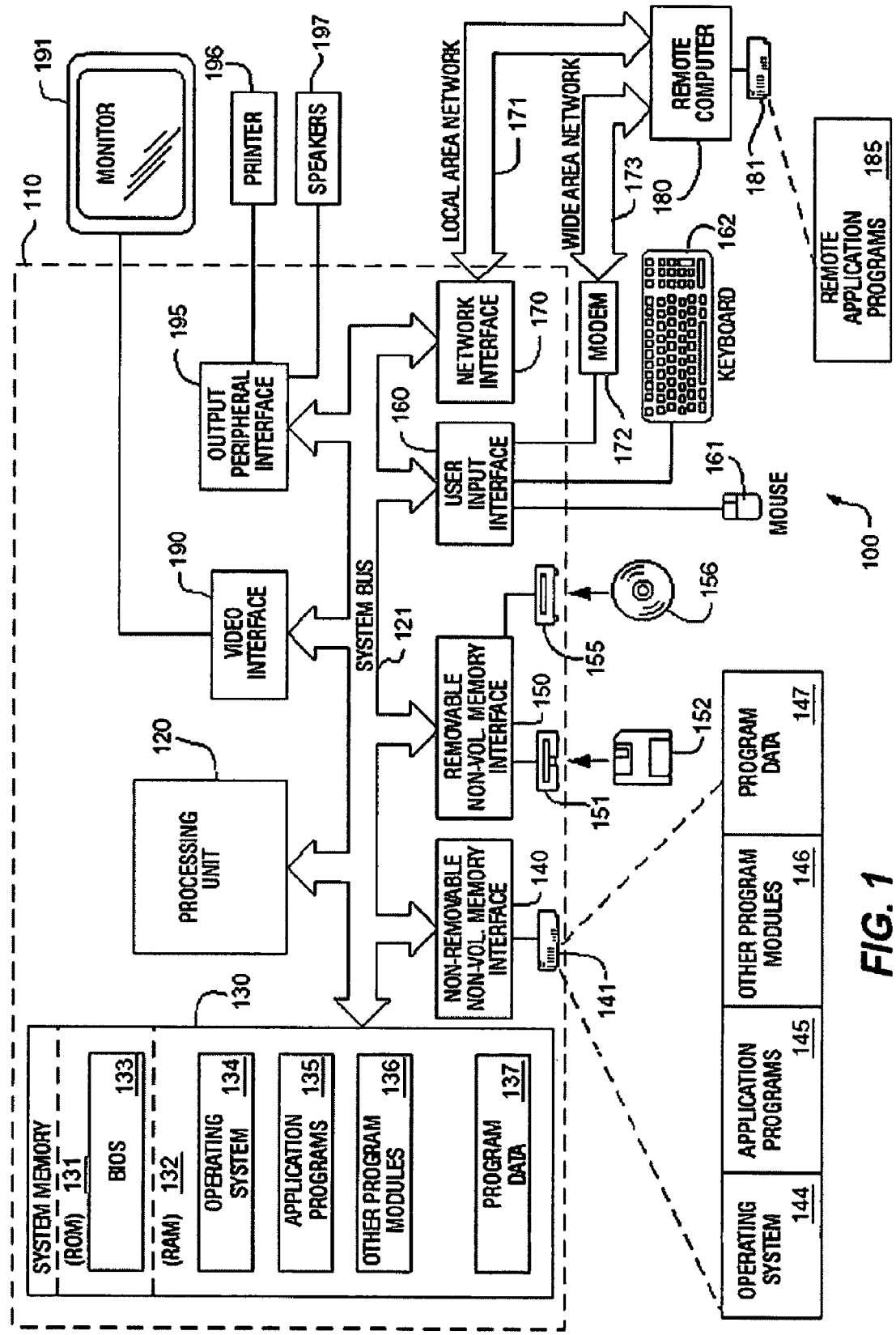
FIG. 1 is a diagrammatic view of a computer system of one aspect of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Given the significant number of unwanted e-mail messages that a typical user receives every day, and given the increased security risk associated with such unwanted messages, there is a need for systems and/or techniques that help improve the security of e-mail messages and/or folders. The present invention is directed toward enhancing the security of electronic mail messages and/or folders in one or more aspects of the system, but the present invention also serves other purposes in addition to these. One or more of the techniques described herein can be implemented as features within an e-mail software program such as MICROSOFT® Office OUTLOOK® or from any other type of program or service that interacts with e-mails. As described in further detail herein, in one aspect of the system, messages that tend to be less secure and have a higher security risk are reformatted and displayed in plain text with hyperlinks disabled in certain circumstances.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
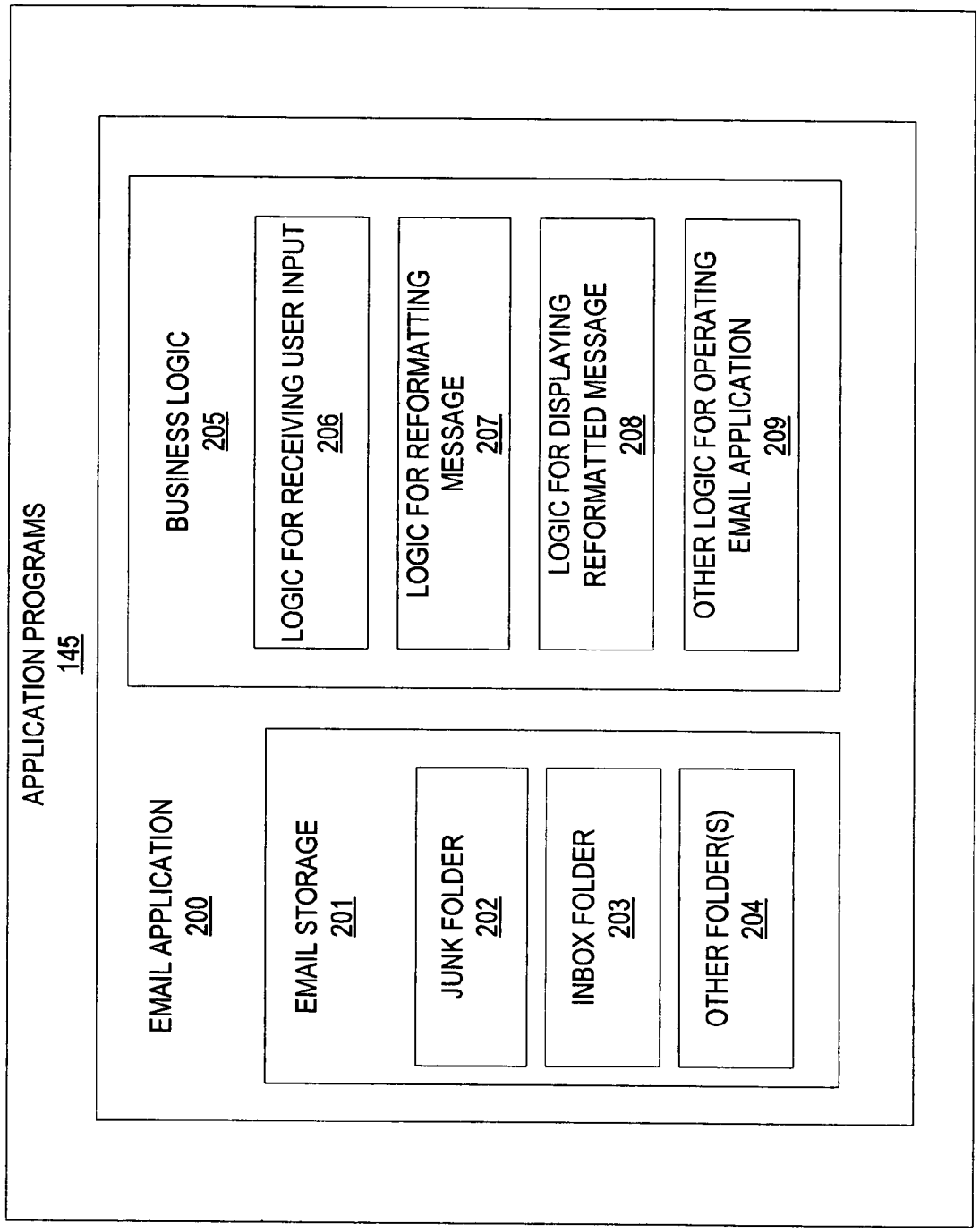
FIG. 2 is a diagrammatic view of an e-mail program operating on the computer system of FIG. 1 in one aspect of the present invention.

Turning now to FIG. 2 with continued reference to FIG. 1, an e-mail application 200 operating on computer 110 in one aspect of the present invention is illustrated. In the example illustrated on FIG. 2, e-mail application 200 is one of application programs 145 that reside on computer 110. Alternatively or additionally, one or more parts of e-mail application 200 can be part of application programs 135 in RAM 132, on remote computer 181 with remote application programs 185, or other such variations as would occur to one in the computer software art.

E-mail application 200 includes e-mail storage 201 and business logic 205. While e-mail storage 201 is shown as part of e-mail application 200 for the sake of clarity, e-mail storage 201 can reside in the same or different location and/or computer(s) than business logic 205. For example, e-mail storage 201 of e-mail application 200 can reside with program data 147 of computer 110, either in a database and/or in one or more files, and/or e-mail storage 201 can reside on a separate computer, such as remote computer 180. As one non-limiting example, e-mail storage 201 can reside all or in part in a directory specified by the user in the file system of operating system 144. As another non-limiting example, e-mail storage 201 can reside all or in part on an e-mail server database that is hosted on remote computer 180, such as an e-mail server database product called Exchange Server by MICROSOFT®. In the example illustrated in FIG. 2, e-mail storage 201 includes a junk e-mail folder 202, an inbox e-mail folder 203, and/or other e-mail folders 204. Other folder variations are also possible. The term folder as used herein is referring to any collection of e-mail messages, however they are stored and/or are represented in a graphical user interface. One of ordinary skill in the art will appreciate that some operating systems do not use the term folder when referring to a collection of e-mail messages, and that such scenarios are still covered by the examples illustrated herein that use the term folder.

Business logic 205 is responsible for carrying out some or all of the techniques described herein. Business logic includes logic for receiving user input 206, logic for reformatting a selected message into a more secure format under the appropriate circumstances 207, logic for displaying the reformatted message 208, and other logic for operating the e-mail application 209. In FIG. 2, business logic 205 is shown to reside on computer 110 as part of application programs 145. However, it will be understood that business logic 205 can alternatively or additionally be embodied as computer-executable instructions on one or more computers and/or in different variations than shown on FIG. 2. As one non-limiting example, one or more parts of business logic 205 could alternatively or additionally be implemented as an XML web service that resides on an external computer that is called when needed.

Figure 3:
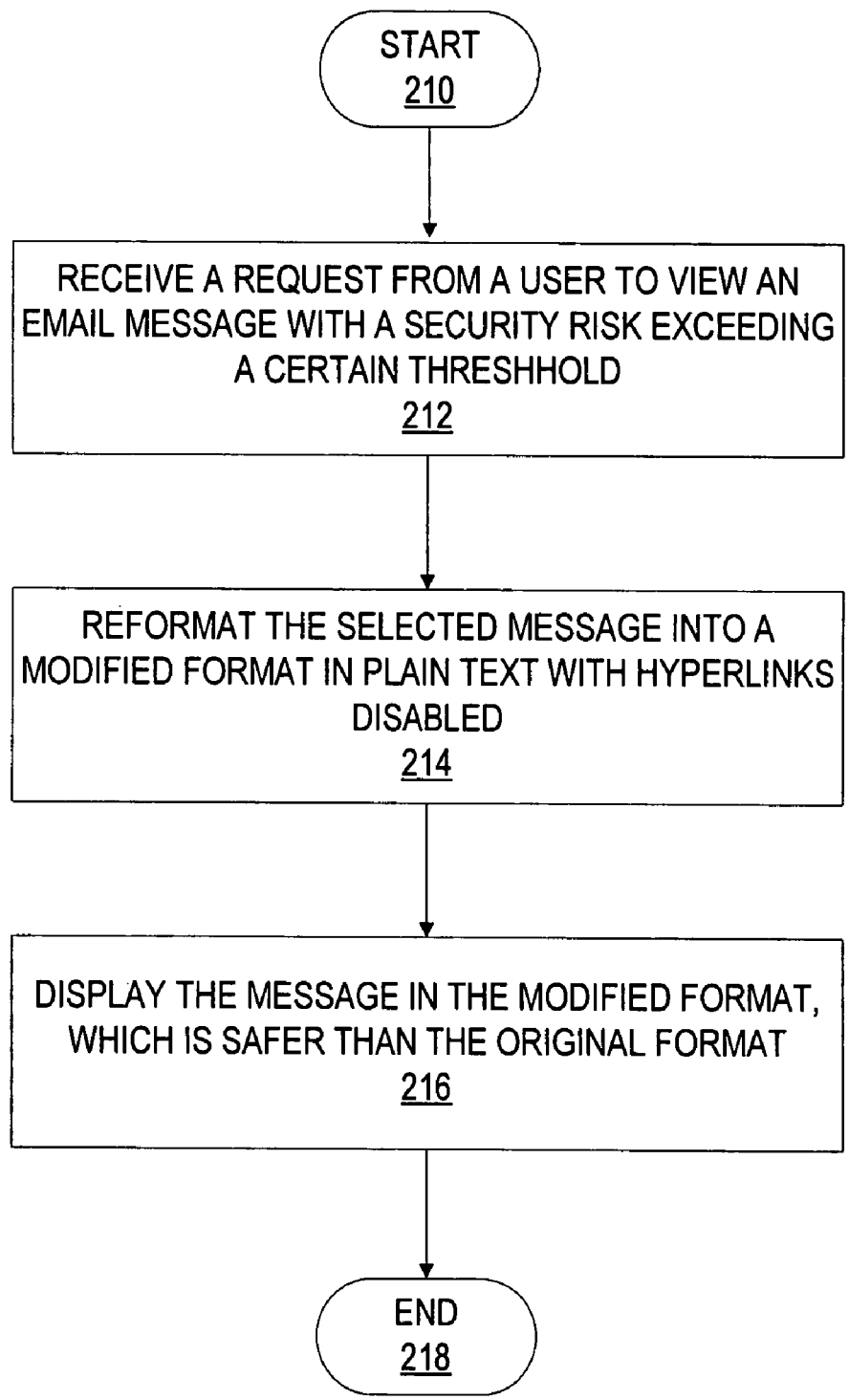
FIG. 3 is a high-level process flow diagram for one aspect of the system of FIG. 1.

Turning now to FIGS. 3-6 with continued reference to FIGS. 1-2, the stages for implementing one or more aspects of e-mail application 200 of system 100 are described in further detail. FIG. 3 is a high level process flow diagram of one aspect of the current invention. In one form, the process of FIG. 3 is at least partially implemented in the operating logic of system 100. The process begins at start point 210 with e-mail application 200 receiving a request from a user to view an e-mail message that has a security risk that exceeds a certain threshold (stage 212). The e-mail message is reformatted from its original format into a modified format, which includes plain text with hyperlinks disabled (stage 214). The message is displayed to the user, such as on monitor 191, in the modified format, which is safer than the original format of the message (stage 216). The process then ends at end point 218. These stages will now be described in further detail in FIGS. 4-6.

Figure 4A:
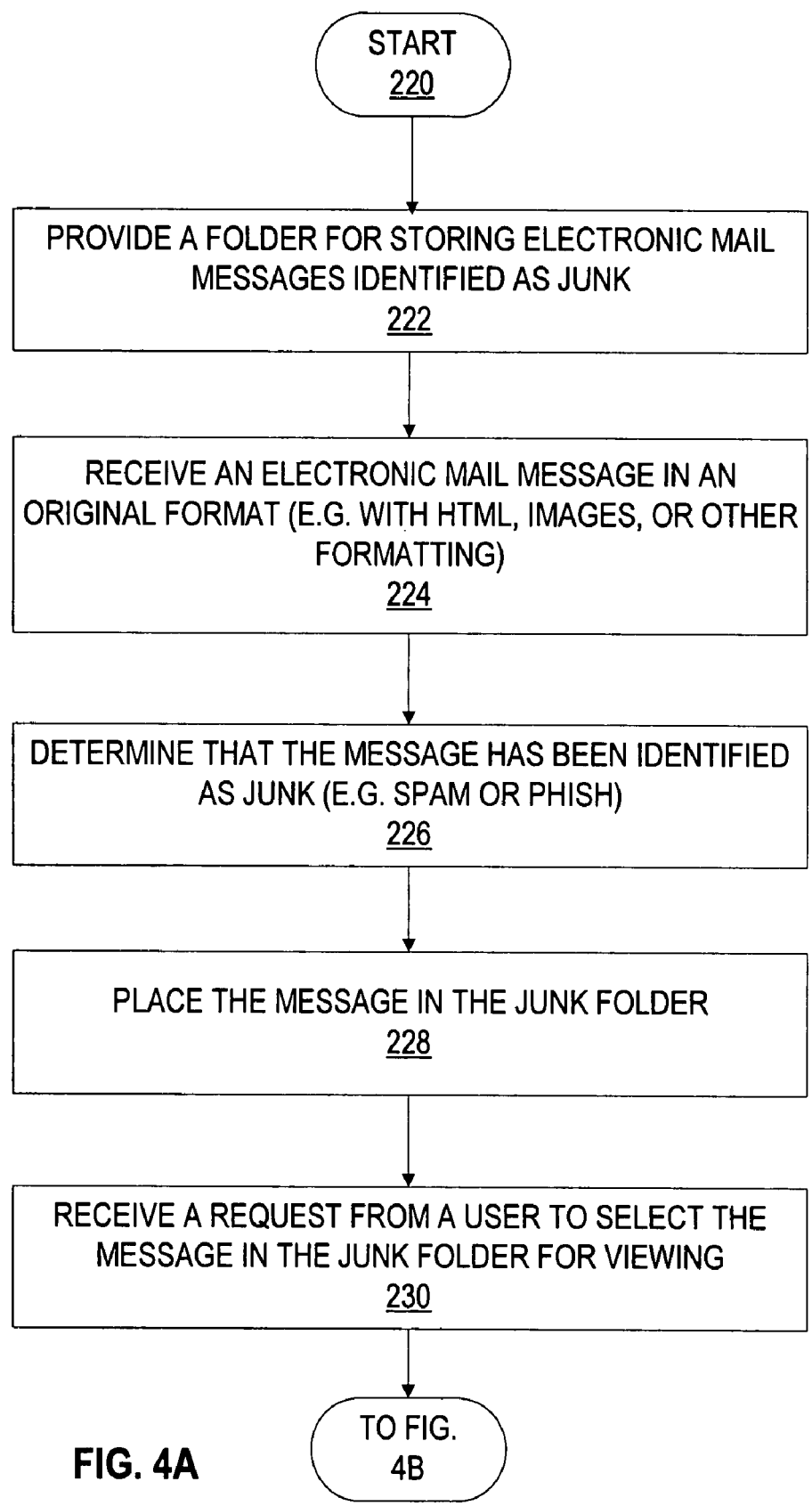
FIG. 4A is a first part of a process flow diagram for one aspect of the system of FIG. 1 illustrating the stages involved in reformatting e-mail messages into a modified format to be displayed to the user.
Figure 4B:
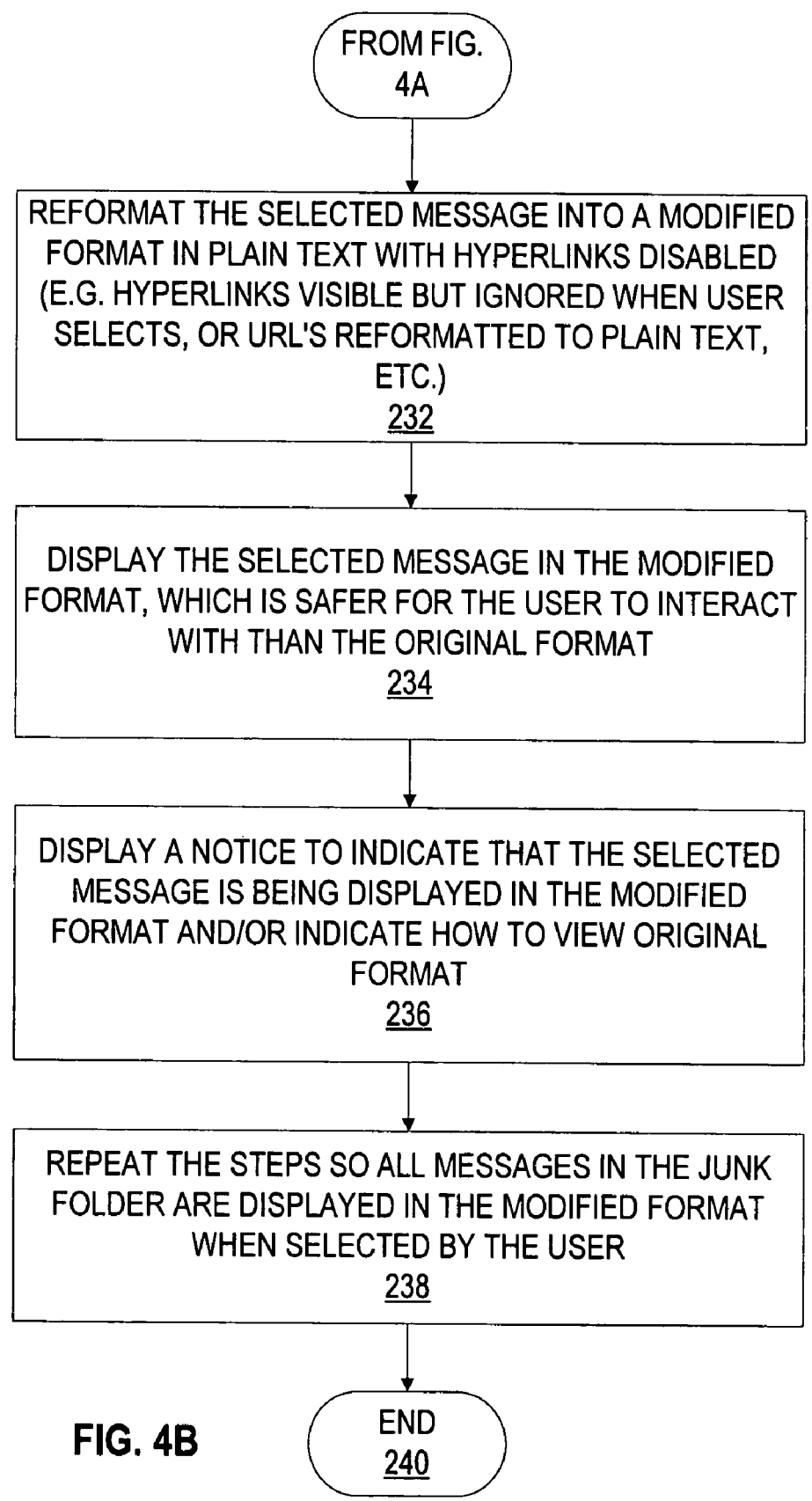
FIG. 4B is a second part of a process flow diagram for one aspect of the system of FIG. 1 illustrating the stages involved in reformatting e-mail messages into a modified format to be displayed to the user.

FIGS. 4A-4B illustrate the stages involved in reformatting e-mail messages into a modified format to be displayed to the user. In one form, the process of FIG. 4 is at least partially implemented in the operating logic of system 100. In one aspect of the invention, the process of FIGS. 4A-4B is used for all messages in junk e-mail folder 202, since messages placed in a junk e-mail folder 202 are by their nature typically less secure. However, it will be appreciated that the stages described in FIGS. 4A-4B can be used with messages in other folders 204 outside of junk e-mail folder 202 or with only some of the messages in junk e-mail folder 202.

The process begins on FIG. 4A at start point 220 with e-mail application 200 providing a junk e-mail folder 202 for storing e-mail messages identified as junk (stage 222). E-mail application 200 receives an electronic mail message in an original format (stage 224). As a few non-limiting examples, the original format can include HTML code, one or more images, bold, underlining, hidden fields, one or more file attachments, and/or other variations. E-mail application 200 determines that the message has been identified as a junk message, such as an unsolicited commercial e-mail (SPAM) and/or a phishing message (designed to lure confidential information by appearing to come from trusted source) (stage 226), to name a few examples. After determining that the message has been identified as junk (stage 226), the message is placed in junk e-mail folder 202 (stage 228).

E-mail application 200 receives a request from a user to select the message in junk e-mail folder 202 for viewing (stage 230). Continuing now with FIG. 4B, e-mail application 200 executes business logic 207 to reformat the selected message into a modified format in plain text with hyperlinks disabled (stage 232). The plain text format will remove all special formatting, such as bold and/or underline, as well as images, etc. The hyperlinks can be disabled in one of various ways. As one non-limiting example, the one or more hyperlinks can still be visible in the e-mail message, but when the user attempts to access the hyperlink, the hyperlink is not followed. As another non-limiting example, the uniform resource locators of the one or more hyperlinks are actually displayed in a plain text format, just as the rest of the message.

E-mail application 200 executes business logic 208 to display the message to the user in the modified format, which is safer for the user to interact with than the original format (stage 234). As a few non-limiting examples, a modified format having a plain text message with disabled hyperlinks is less likely to cause damage to the user's computer or the user (i.e. is safer) than each of the following: an e-mail message with an image that sends a signal to a remote server to verify the validity of the e-mail address, a phishing e-mail message that is able to get the user to access a hyperlink to visit an external web site and provide confidential information, or another e-mail that is able to get the user to access a hyperlink to visit an external web site that installs some type of virus or retrieves confidential information from the user's hard drive.

E-mail application 200 can display a notice to the user to indicate that the selected message is being displayed in the modified format and/or to indicate how the user can view the message in its original format (stage 236). Some or all of these stages can be repeated as appropriate so that all messages in junk e-mail folder 202 are displayed in the modified format when selected by the user (stage 238). The process ends at end point 240.

Figure 5:
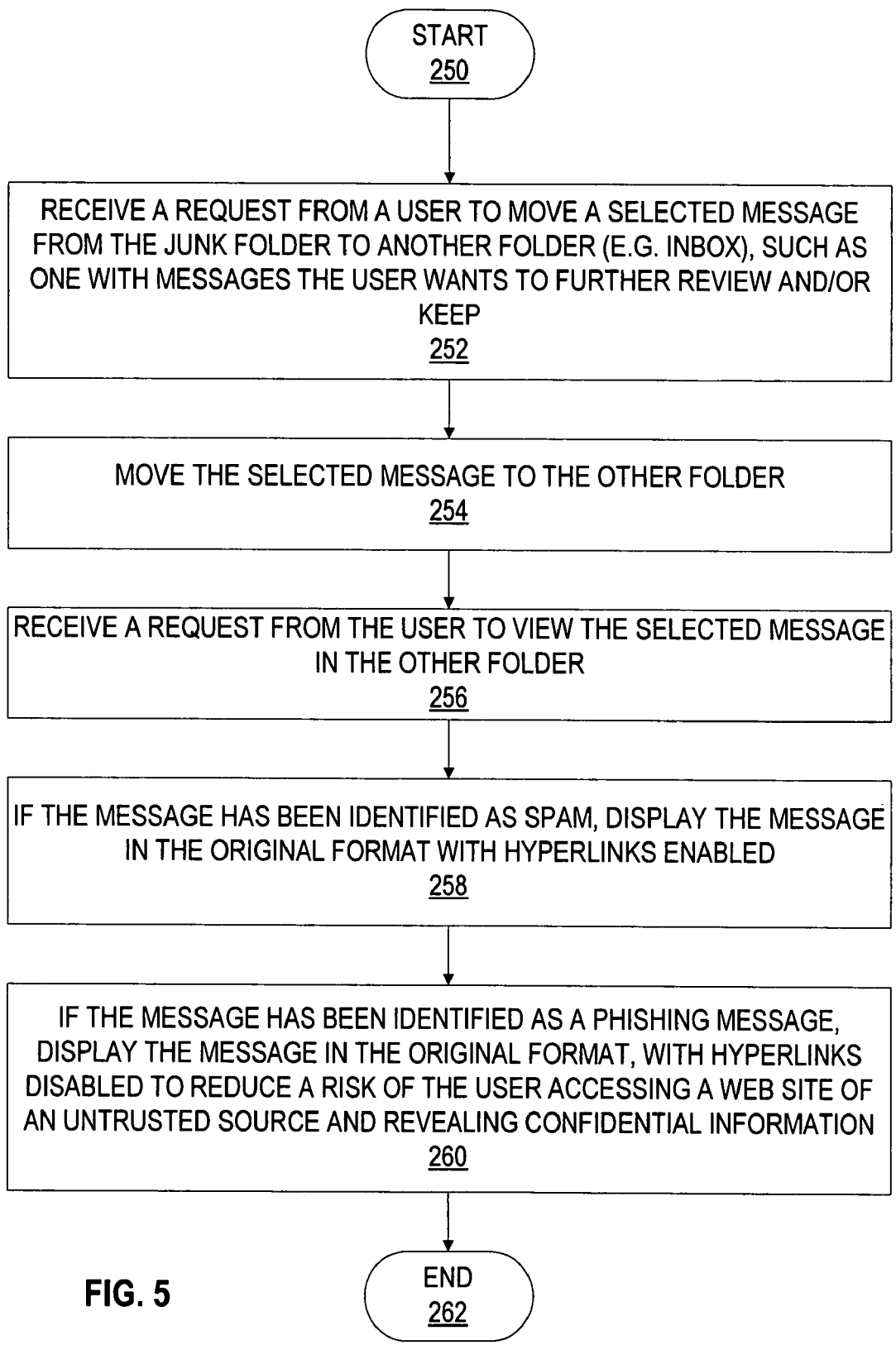
FIG. 5 is a process flow diagram for one aspect of the system of FIG. 1 illustrating the stages involved in moving an e-mail from one folder to another and changing how the e-mail is displayed when selected from the other folder.

FIG. 5 illustrates the stages involved in moving an e-mail from one folder to another and changing how the e-mail is displayed when selected from the other folder. In one form, the process of FIG. 5 is at least partially implemented in the operating logic of system 100. In one aspect of the invention, the process of FIG. 5 is used when moving messages from junk e-mail folder 202 to inbox e-mail folder 203. However, it will be appreciated that the stages described in FIG. 5 can be used with messages in other folders 204 than just junk e-mail folder 202 or inbox e-mail folder 203.

The process begins at start point 250 with e-mail application 200 receiving a request from a user to move a selected message from the junk e-mail folder 202 to another folder, such as inbox e-mail folder 203 (stage 252). The other folder may have messages that the user wants to further review and/or keep. E-mail application 200 moves the selected message to inbox e-mail folder 203 or other e-mail folder 204 (stage 254). E-mail application 200 receives a request from the user to view the selected message in inbox e-mail folder 203 (stage 256). If the message has been identified as an unsolicited commercial e-mail (SPAM), then e-mail application 200 displays the message in its original format and with hyperlinks enabled (i.e. completely in its original format) (stage 258). If the message has been identified as a phishing message (and thereby poses a higher security risk than just a SPAM message), then the message is displayed in the original format but with hyperlinks disabled (stage 260). Hyperlinks are disabled in the phishing message when opened from inbox e-mail folder 203 to reduce a risk that the user will access the web site of an un-trusted source and reveal confidential information (stage 260). Other variations for formatting messages moved from the junk e-mail folder to the inbox are also possible, such as displaying the original e-mail but with hyperlinks disabled for both SPAM and phishing messages. The process then ends at stage 262.

Figure 6:
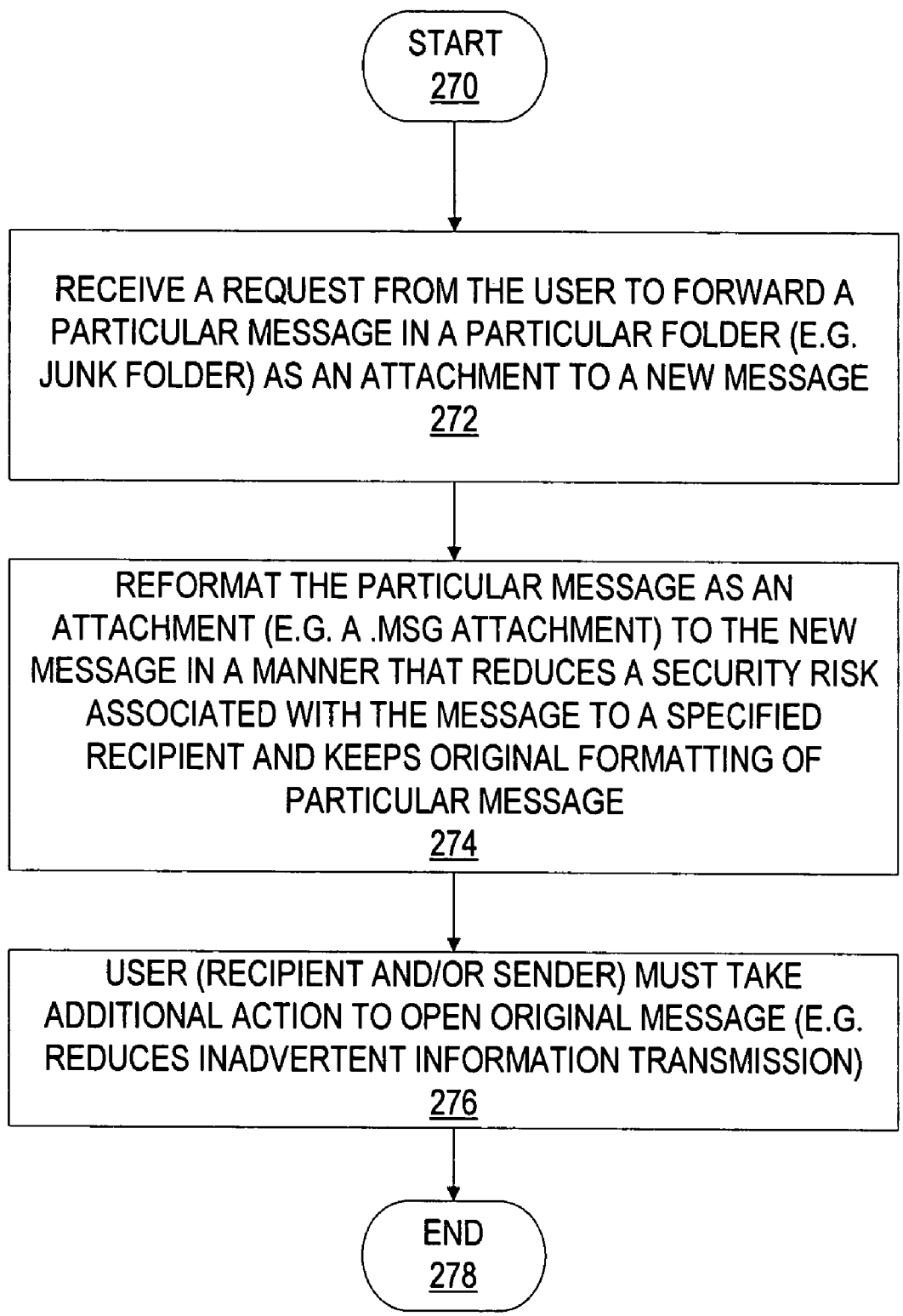
FIG. 6 is a process flow diagram for one aspect of the system of FIG. 1 illustrating the stages involved in forwarding an existing e-mail as an attachment in a more secure fashion.

FIG. 6 illustrates the stages involved in forwarding an existing e-mail as an attachment in a more secure fashion. In one form, the process of FIG. 6 is at least partially implemented in the operating logic of system 100. The process begins at start point 270 with e-mail application 200 receiving a request from the user to forward a particular message in a particular folder (e.g. junk e-mail folder 202) as an attachment to a new message (stage 272). E-mail application 200 reformats the particular message as an attachment to the new e-mail message in a manner that reduces a security risk associated with the message and keeps the original formatting of the message (stage 274). As one non-limiting example, the message can be an attachment to the new e-mail in a .MSG attachment format. When interacting with the new message, the user (recipient and/or sender) must take an additional action to open the attachment if and when the user wishes to view the original message contained in the attachment (stage 276). The security risk of the user inadvertently clicking on a hyperlink in the original message and/or otherwise transmitting information to a third party inadvertently when dealing with the original message is reduced (stage 276). The process then ends at stage 278.

Figure 7:
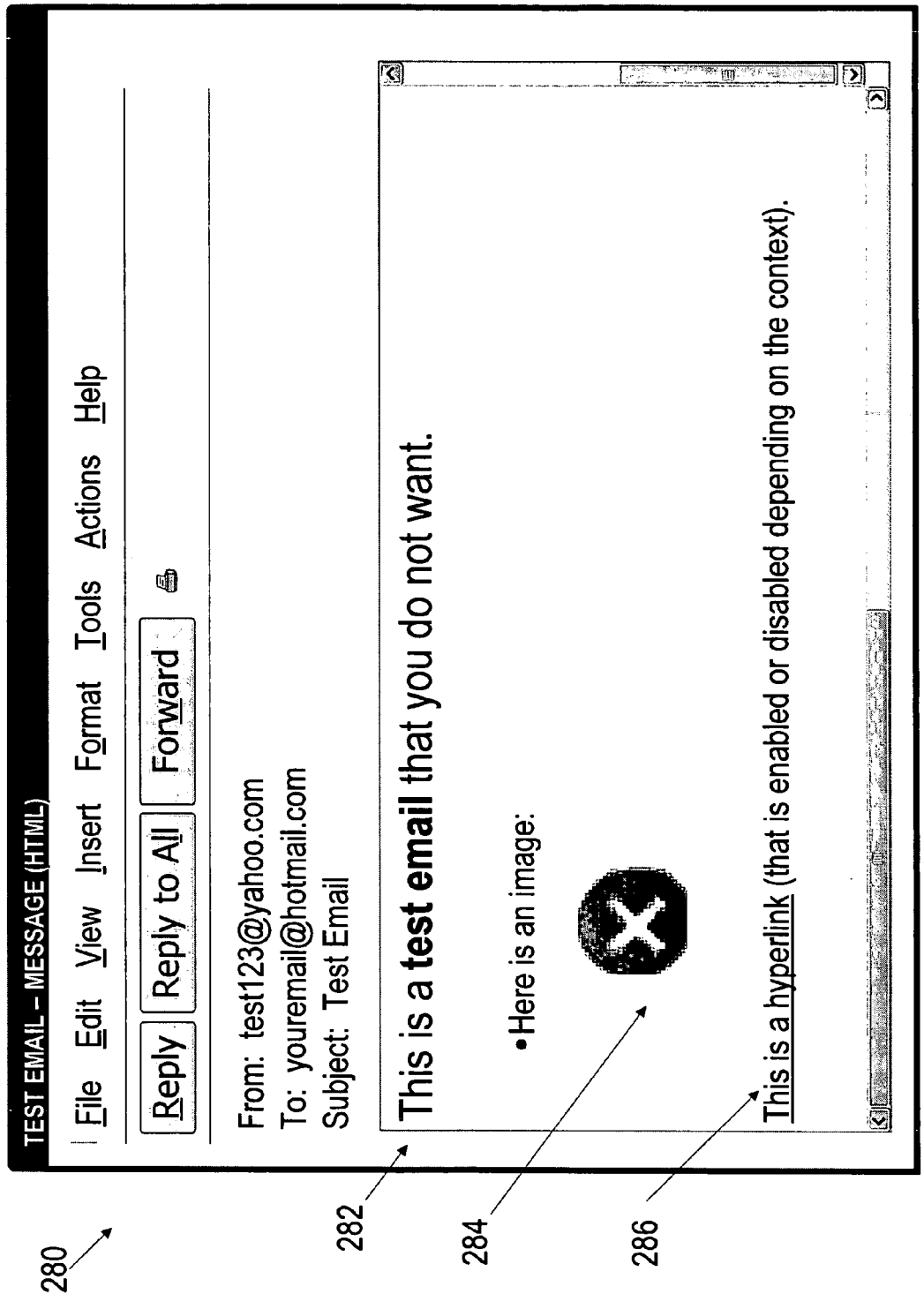
FIG. 7 is a simulated screen for one aspect of the system of FIG. 1 that illustrates how an e-mail message appears in its original formatting.

Turning now to FIGS. 7-10, simulated screens will be used to illustrate some of the concepts described in FIGS. 3-6. FIG. 7 is a simulated screen 280 that illustrates a sample of how a particular e-mail message appears in its original formatting. The body 282 of the e-mail message includes various formatting, an image 284, and a hyperlink 286. In one aspect of the invention, if the e-mail message has been placed in junk e-mail folder 202, then this original formatting will not be visible to the user until the message is moved to inbox e-mail folder 203. Other variations are also possible for when this original format can be displayed to the user.

Figure 8:
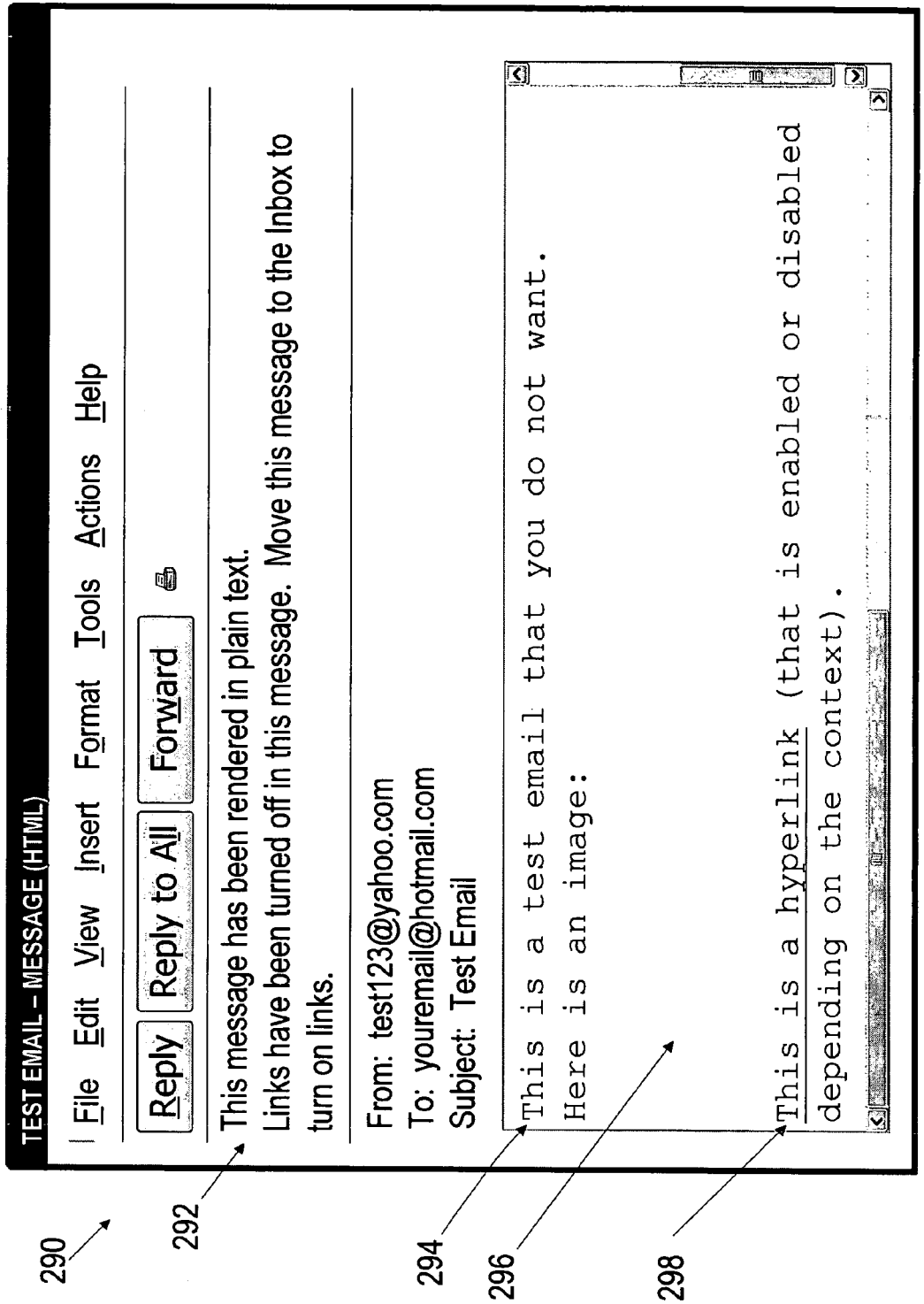
FIG. 8 is a simulated screen for one aspect of the system of FIG. 1 illustrating how the e-mail message of FIG. 7 would appear as plain text with hyperlinks visible but disabled as described in the stages of FIGS. 4A-4B.
Figure 9:
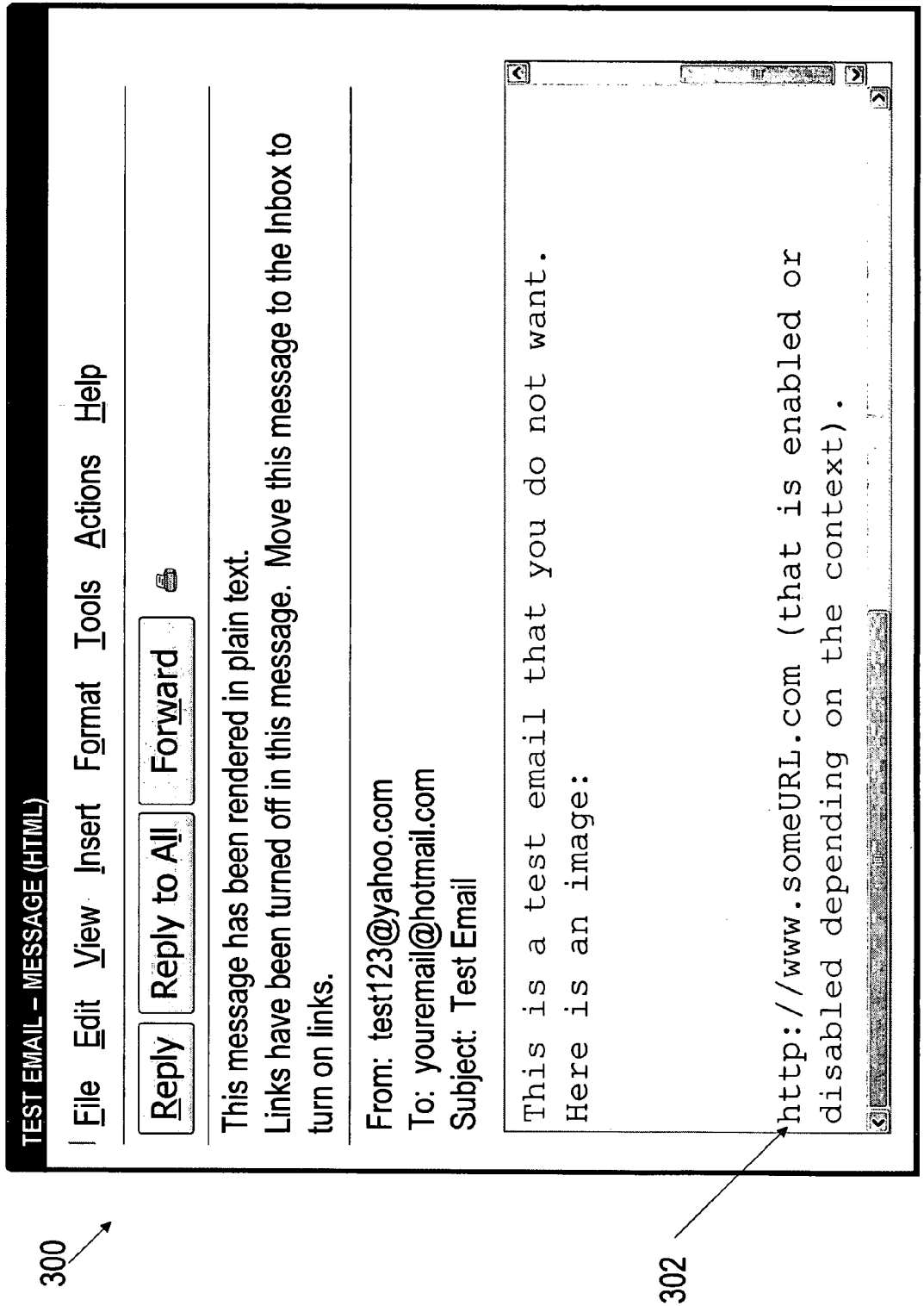
FIG. 9 is a simulated screen for another aspect of the system of FIG. 1 illustrating how the e-mail message of FIG. 7 would appear as plain text with hyperlinks disabled and rendered in plain text as described in the stages of FIGS. 4A-4B.

Turning now to FIGS. 8 and 9, simulated screens 290 and 300 illustrate how the e-mail message shown in FIG. 7 appears when reformatted and displayed in the modified format as described in stages 232 and 234 of FIG. 4. Screen 290 of FIG. 8 includes a notice 292 to indicate that the message has been rendered in plain text, that links have been turned off, and that links can be turned on if the message is moved to the inbox e-mail folder 203 (stage 236). Various other types of notices could be displayed in other aspects of the invention. The body 294 of the message is displayed in plain text, and the image is missing 296. The hyperlink 298 is visible, but is disabled. When the user tries to follow the hyperlink, the request will be ignored (e.g. the click event ignored or some other variation followed to keep the link from being accessed). Screen 300 of FIG. 9 is nearly identical to screen 290, except that screen 300 shows another variation of how hyperlinks can be disabled in the modified message format. In this variation, the uniform resource locator (URL) of the hyperlink 302 is displayed in plain text along with the rest of the message.

Figure 10:
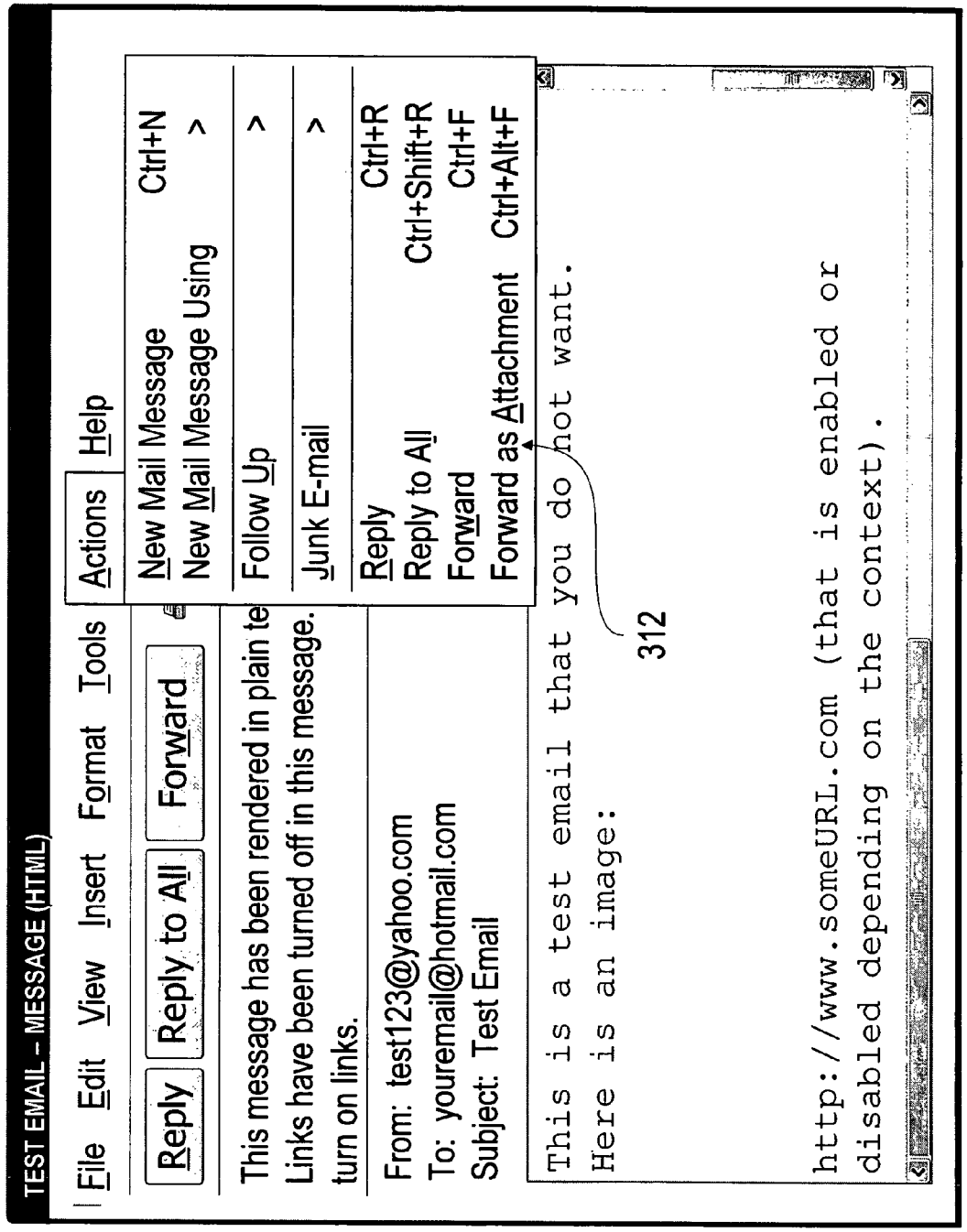
FIG. 10 is a simulated screen for one aspect of the system of FIG. 1 illustrating forwarding a message as an attachment as illustrated in the stages of FIG. 6.

Turning now to FIG. 10, a simulated screen 310 illustrates how to forward an e-mail message as an attachment, as described in the stages of FIG. 6. When the user selects the Forward as Attachment option 312, e-mail application 200 receives the request (stage 272) and creates a new message with the selected message as an attachment (stage 274). The attachment retains the original formatting but reduces a security risk associated with the message (stage 274). When interacting with the new message, the user (recipient and/or sender) must take an additional action to open the attachment if and when the user wishes to view the original message, thereby reducing the risk of the user inadvertently clicking on a hyperlink in the original message and/or otherwise inadvertently transmitting information to a third party (stage 276).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the inventions as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples and still be within the spirit of the invention.

What is claimed is:

1. A computer-readable storage medium that does not consist of a signal, the computer-readable medium having computer-executable instructions for causing a computer to perform steps comprising:

providing, in electronic mail storage of an electronic mail application, a junk folder of a user to store a plurality of junk electronic mail messages that have been sent to the user from un-trusted sources and that have been identified by the electronic mail application as spam messages or phishing messages, wherein each junk message in the junk folder of the user is stored in its original format as sent by an un-trusted source and received by the electronic mail application;

providing, in the electronic mail storage of the electronic mail application, an inbox folder of the user to store a selected message having at least one hyperlink included in a body of the selected message in its original format upon being moved by the user from the junk folder to the inbox folder, wherein when the selected message is displayed in its original format, text of a uniform resource locator associated with the at least one hyperlink is hidden from view of the user;

in response to receiving a request from the user to view the selected message when in the junk folder:

reformatting the selected message having the at least one hyperlink included in the body of the selected message from its original format into a modified format, the modified format comprising a plain text format for reformatting the body of the selected message with the at least one hyperlink disabled, and displaying the selected message in the modified format with the at least one hyperlink disabled and the text of the uniform resource locator associated with the at least one hyperlink visible to the user as plain text in the body of the selected message, and in response to receiving a request from the user to view the selected message when in the inbox folder after being moved by the user from the junk folder to the inbox folder:

displaying the selected message in its original format with the at least one hyperlink enabled if the selected message has been identified as a spam message, and displaying the selected message in its original format with the at least one hyperlink disabled if the selected message has been identified as a phishing message.

2. The computer-readable storage medium of claim 1 further having computer-executable instructions for:

displaying a notice to indicate that the selected message is being displayed in the modified format.

3. The computer-readable storage medium of claim 1 further having computer-executable instructions for:

receiving a selection from the user indicating that the user is attempting to access a particular hyperlink that has been disabled in the selected message; and preventing access to the particular hyperlink by the user.

4. The computer-readable storage medium of claim 1, wherein reformatting the selected message comprises removing formatting and images from the body of the selected message.

5. The computer-readable storage medium of claim 1 further having computer-executable instructions for:

receiving a request from the user to move the selected message to another folder;

moving the selected message to the another folder; and in response to receiving a request from the user to view the selected message when in the another folder:

displaying the selected message in its original format with the at least one hyperlink enabled if the selected message has been identified as a spam message, and displaying the selected message in its original format with the at least one hyperlink disabled if the selected message has been identified as a phishing message.

6. The computer-readable storage medium of claim 1 further having computer-executable instructions for:

receiving a request from the user to forward a particular message in the junk folder as an attachment to a new message; and reformatting the particular message as an attachment to the new message.

7. An apparatus for enhancing electronic mail message security comprising:

electronic mail storage of an electronic mail application including a junk folder of a user and an inbox folder of the user, the junk folder to store a plurality of junk electronic mail messages that have been sent to the user from un-trusted sources and that have been identified by the electronic mail application as spam messages or phishing messages, each junk message in the junk folder of the user being stored in its original format as sent by an un-trusted source and received by the electronic mail application, the inbox folder of the user to store a selected electronic mail message having at least one hyperlink included in a body of the selected message in its original format upon being moved by the user from the junk folder to the inbox folder, wherein when the selected message is displayed in the inbox folder in its original format, text of a uniform resource locator associated with the at least one hyperlink is hidden from view of the user;

means responsive to a request from the user to view the selected electronic mail message when in the junk folder for:

reformatting the selected electronic mail message having the at least one hyperlink included in the body of the selected message from its original format into a modified format, the modified format comprising a plain text format for reformatting the body of the selected electronic mail message with the at least one hyperlink disabled, and displaying the selected electronic mail message in the modified format with the at least one hyperlink disabled and the text of the uniform resource locator associated with the at least one hyperlink visible to the user as plain text in the body of the selected message; and means responsive to a request from the user for to view the selected electronic mail message when in the inbox folder after being moved by the user from the junk folder to the inbox folder for:

displaying the selected electronic mail message in its original format with the at least one hyperlink enabled if the selected electronic mail message has been identified as a spam message, and displaying the selected electronic mail message in its original format with the at least one hyperlink disabled if the selected electronic mail message has been identified as a phishing message.

8. A method for improving security of electronic mail messages comprising the steps of:

receiving, at an electronic mail application on a computing device, an electronic mail message in its original format as sent to a user by an un-trusted source, the electronic mail message comprising at least one hyperlink in a body of the electronic mail message, wherein when the electronic mail message is displayed in its original format, text of a uniform resource locator associated with the at least one hyperlink is hidden from view of the user;

determining that the electronic mail message is a junk message;

identifying the electronic mail message as a spam message or a phishing message;

placing the electronic mail message in a junk folder of the user within electronic mail storage of the electronic mail application, the junk folder being used to store junk messages that have been sent to the user from un-trusted sources and that have been identified by the electronic mail application spam messages or phishing messages, the electronic mail message being stored in the junk folder in its original format as sent by the un-trusted source and as received by the electronic mail application;

providing, in the electronic mail storage of the electronic mail application, an inbox folder of the user to store the electronic mail message in its original format upon being moved by the user from the junk folder to the inbox folder;

in response to receiving a request from the user to view the electronic mail message when in the junk folder:

reformatting the electronic mail message from its original format to a modified format, the modified format comprising a plain text format for reformatting the body of the electronic mail message with the at least one hyperlink disabled, and displaying the electronic mail message in the modified format with the at least one hyperlink disabled and the text of the uniform resource locator associated with the at least one hyperlink visible to the user as plain text in the body of the electronic mail message; and in response receiving a request from the user to view the electronic mail message when in the inbox folder after being moved by the user from the junk folder to the inbox folder:

displaying the electronic mail message in its original format with the at least one hyperlink enabled if the electronic mail message has been identified as a spam message, and displaying the electronic mail message in its original format with the at least one hyperlink disabled if the electronic mail message has been identified as a phishing message.

9. The method of claim 8, further comprising;

receiving a request from the user to view each of a plurality of junk messages in the junk folder; and reformatting and displaying each junk message in the modified format in response to each request to view each junk message in the junk folder.

10. The method of claim 8, further comprising:

displaying a notice to indicate that the electronic mail message is being displayed in the modified format.

11. The method of claim 8, wherein the electronic mail message includes HTML and at least one image in its original format.

12. The method of claim 8, wherein the electronic mail message is an unsolicited commercial e-mail and is identified as a spam message.

13. The method of claim 8, wherein the electronic mail message is designed to obtain sensitive information from the user by falsely representing a trusted source and is identified as a phishing message.

14. The method of claim 8, wherein reformatting the electronic mail message includes removing formatting and images from the body of the electronic mail message.

15. The method of claim 8, further comprising:

receiving a selection from the user indicating that the user is attempting to access a particular hyperlink that has been disabled in the electronic mail message; and preventing access to the particular hyperlink by the user.

16. The method of claim 8, further comprising:

receiving a request from the user to move the electronic mail message to another folder;

moving the electronic mail message to the another folder in response to the request from the user to move the electronic mail message; and receiving a request from the user to view the electronic mail message in the another folder.

17. The method of claim 16, further comprising:

displaying the electronic mail message when in the another folder in its original format with the at least one hyperlink enabled if the electronic mail message has been identified as a spam message.

18. The method of claim 16, further comprising:

displaying the electronic mail message when in the another folder in its original format with the at least one hyperlink disabled if the electronic mail message has been identified as a phishing message.

19. A computer-readable storage medium that does not consist of a signal, the computer-readable storage medium having computer-executable instructions causing a computer to perform the steps recited in claim 8.

20. The method of claim 16, further comprising:

receiving a request from the user to forward the electronic mail message as an attachment to a new message; and reformatting the electronic mail message as an attachment to the new message.

* * * * *